Nov. 7, 1933.   R. E. PARIS   1,933,996
ATTACHMENT FOR METERS
Filed Dec. 31, 1929    14 Sheets-Sheet 1
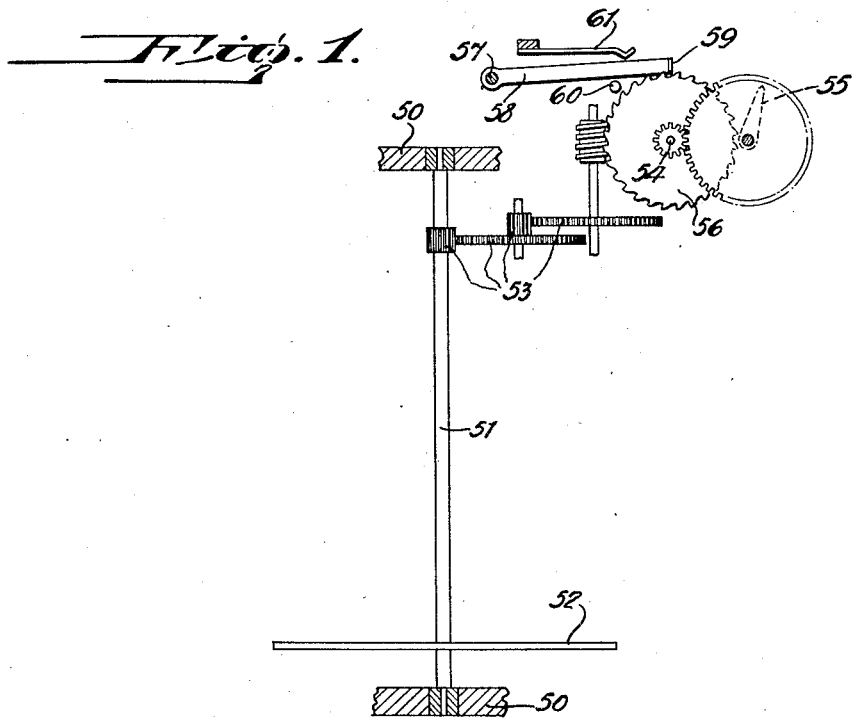
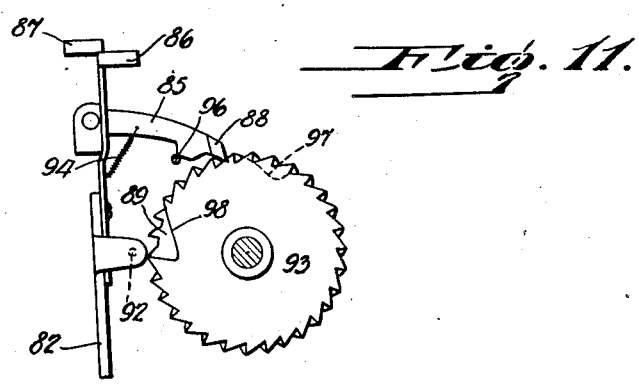
Robert E. Paris  Inventor
By his Attorney W. A. Sparks Nov. 7, 1933. R. E. PARIS 1,933,996
ATTACHMENT FOR METERS
Filed Dec. 31, 1929 14 Sheets-Sheet 2
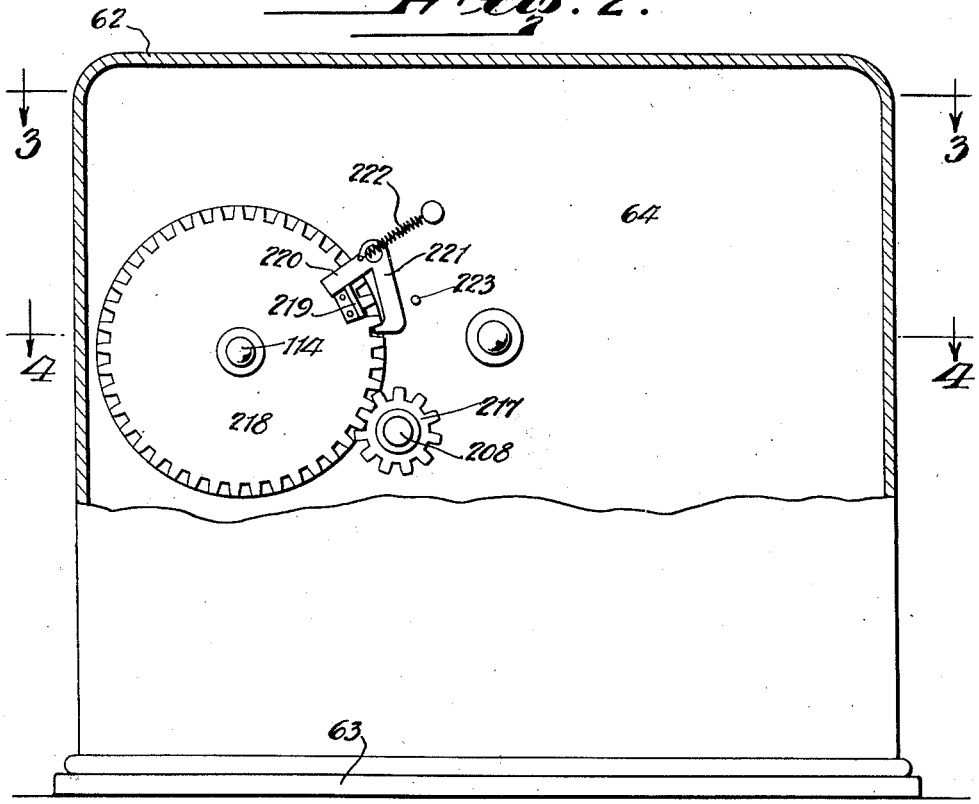
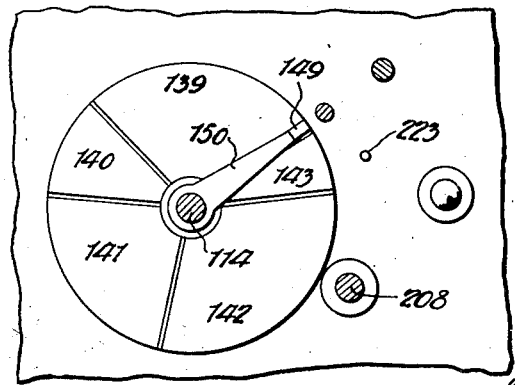
Robert E. Paris
Inventor
By his Attorney W. A. Sparks

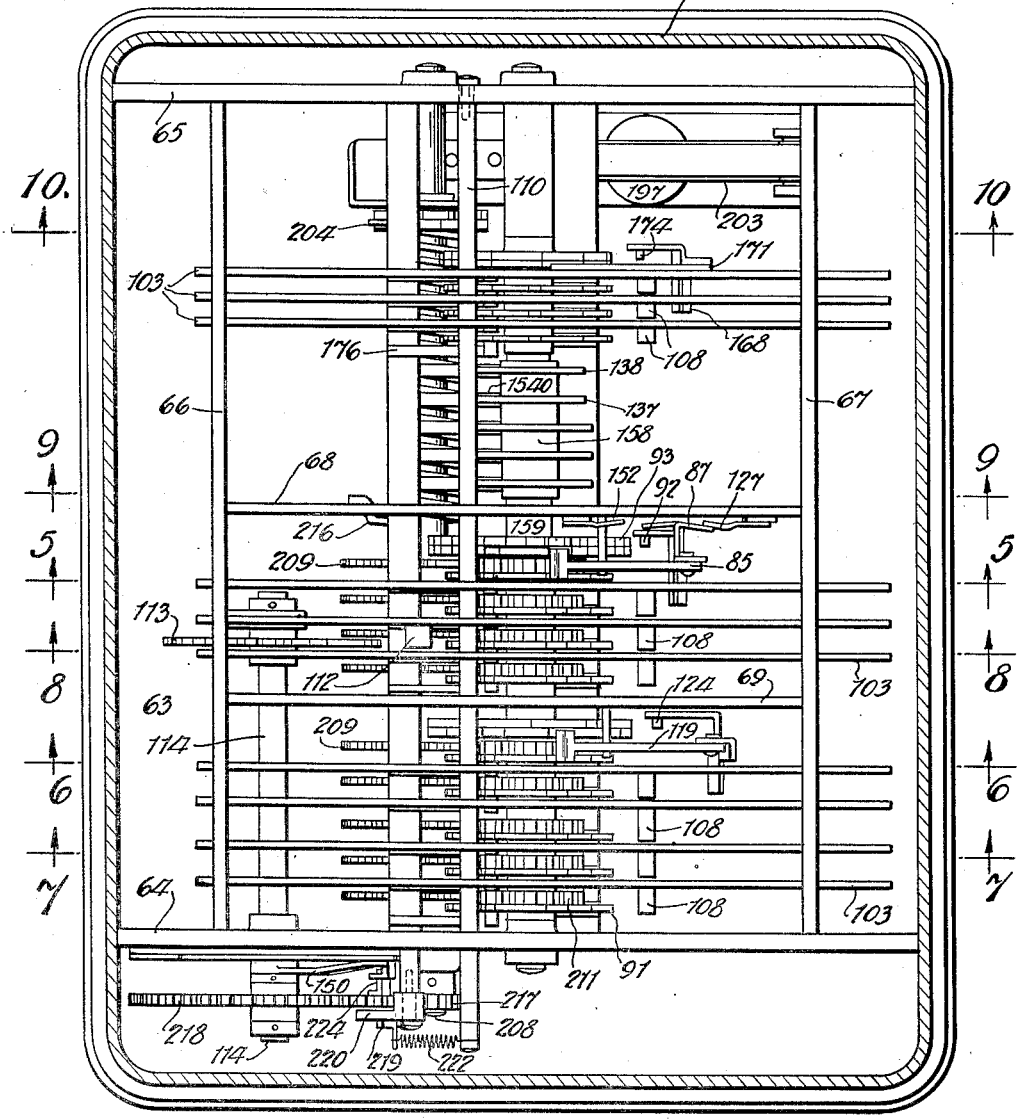

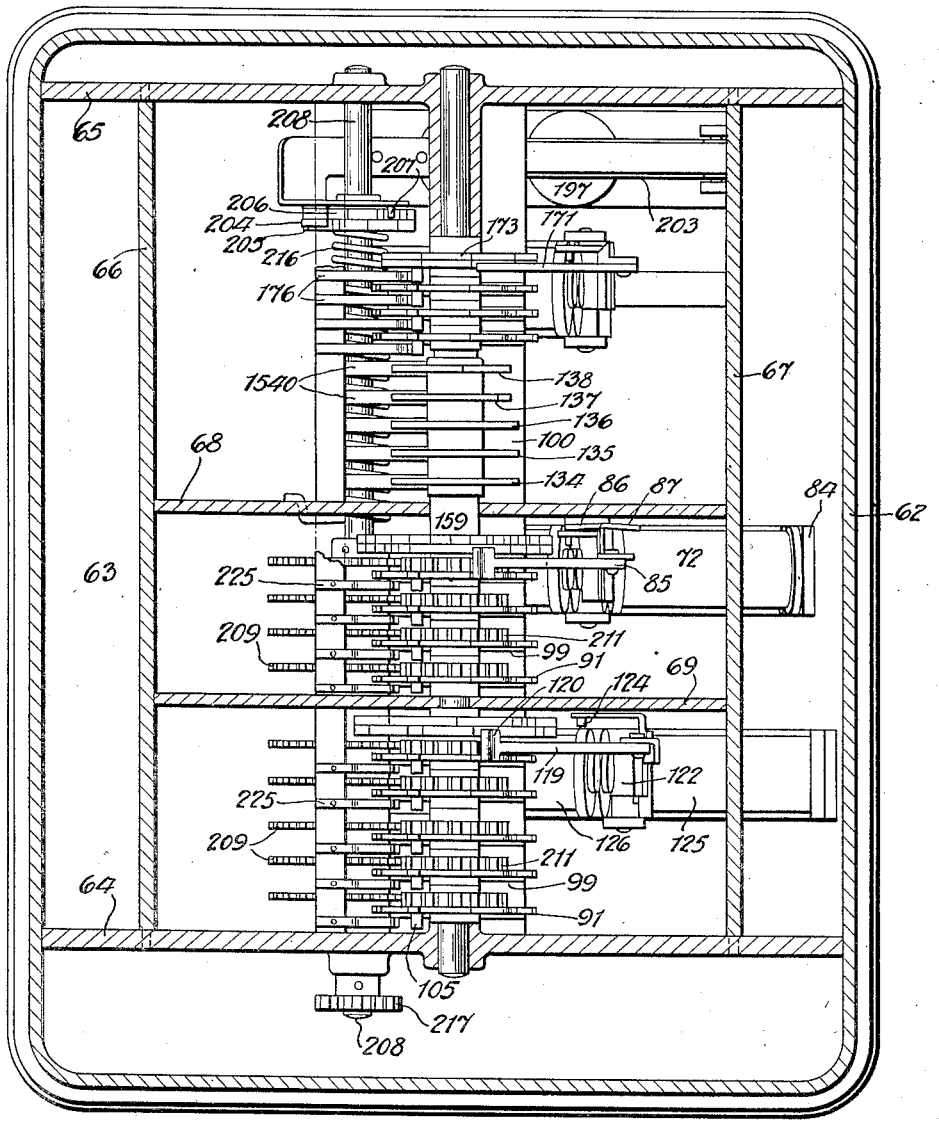

Nov. 7, 1933.  R. E. PARIS  1,933,996
ATTACHMENT FOR METERS
Filed Dec. 31, 1929  14 Sheets-Sheet 5
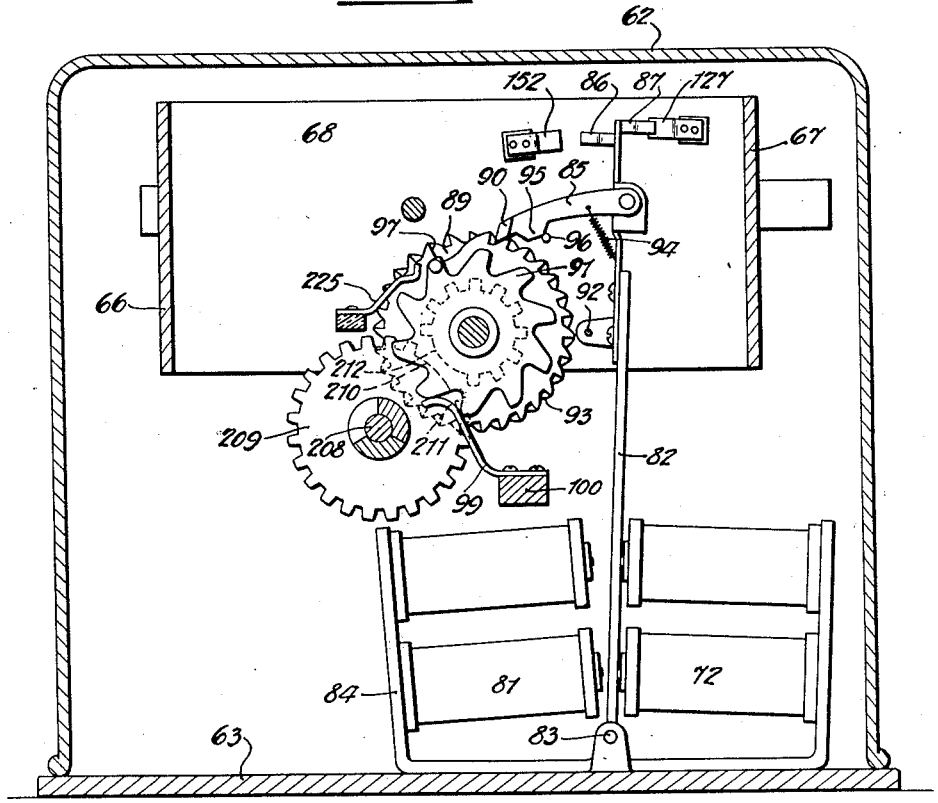
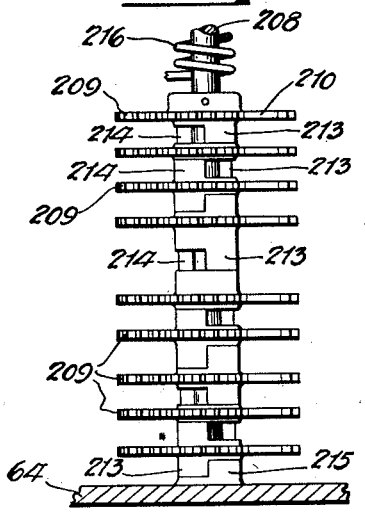
Robert E. Paris Inventor
By his Attorney H. A. Sparks Nov. 7, 1933.   R. E. PARIS   1,933,996
ATTACHMENT FOR METERS
Filed Dec. 31, 1929    14 Sheets-Sheet 6

Robert E. Paris Inventor
By his Attorney W. A. Sparks

Nov. 7, 1933.    R. E. PARIS    1,933,996
ATTACHMENT FOR METERS
Filed Dec. 31, 1929    14 Sheets-Sheet 7
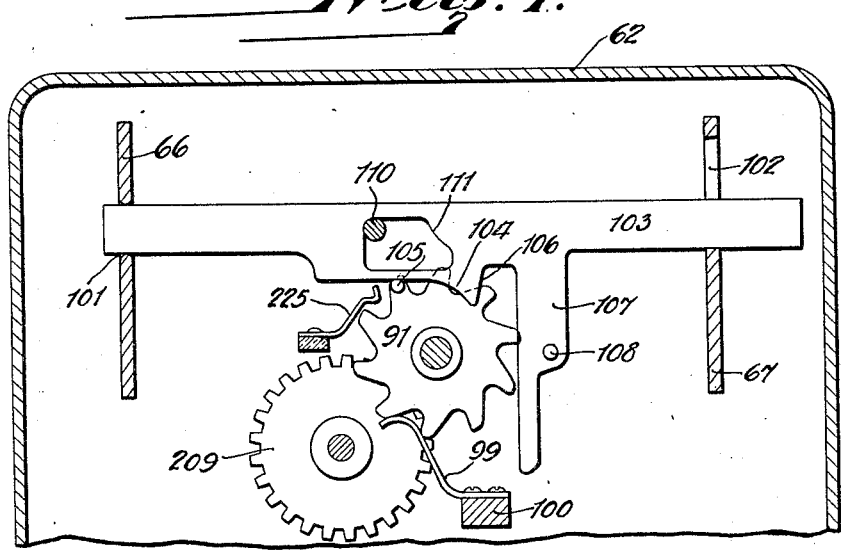
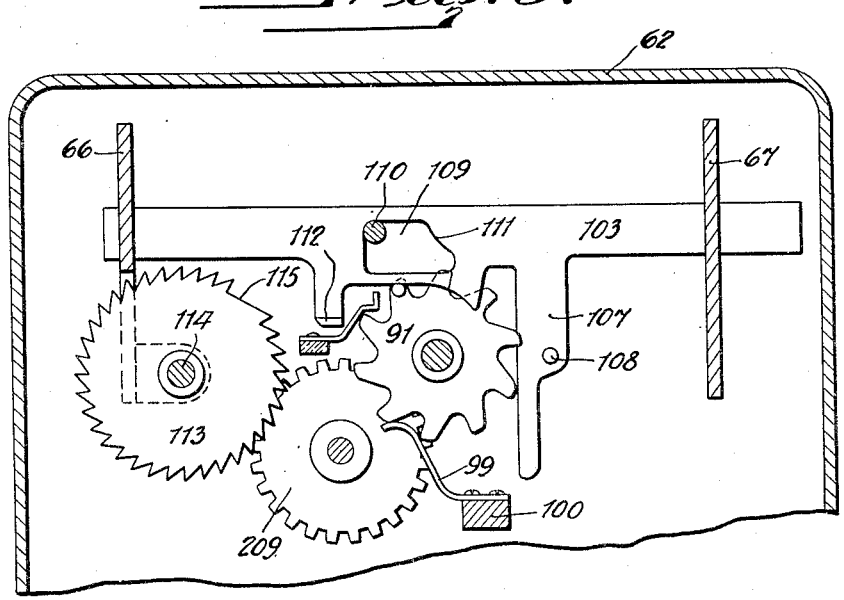
Robert E. Paris  Inventor
By his Attorney W. A. Sparks

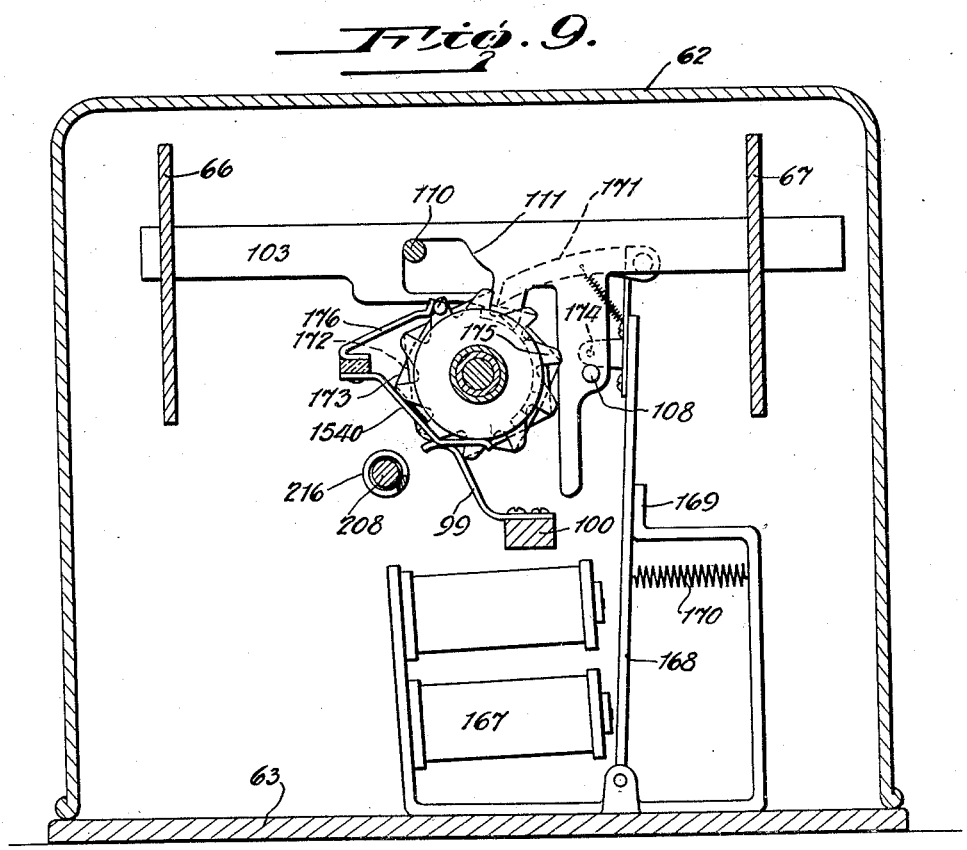
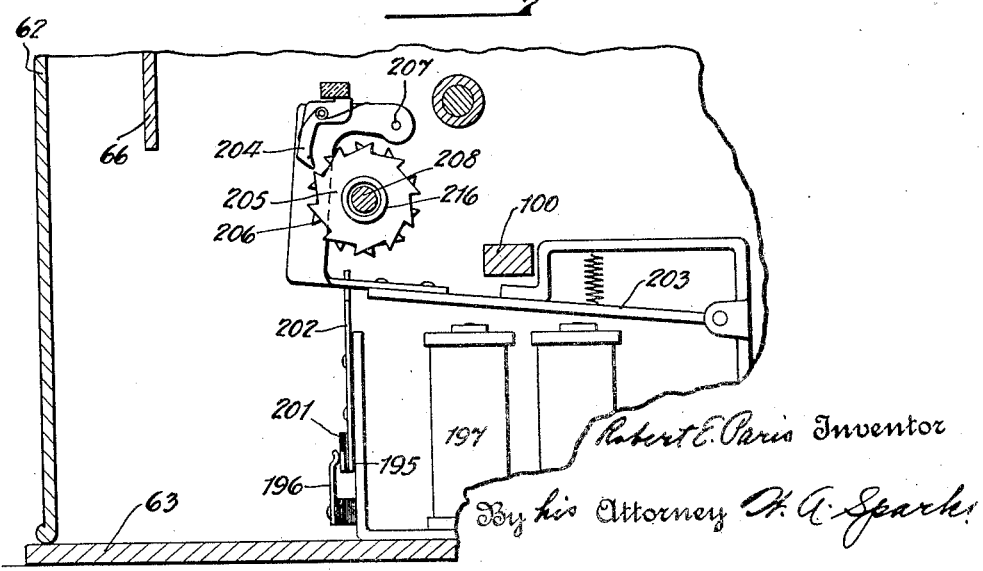

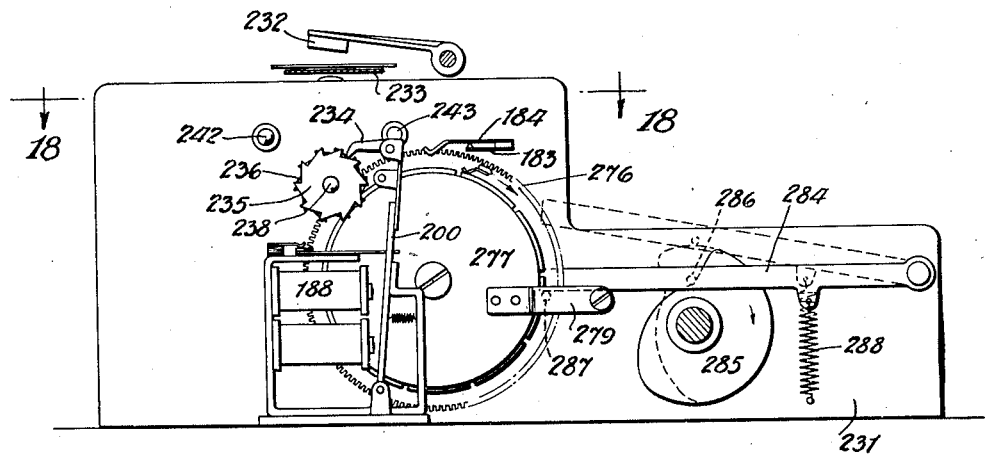
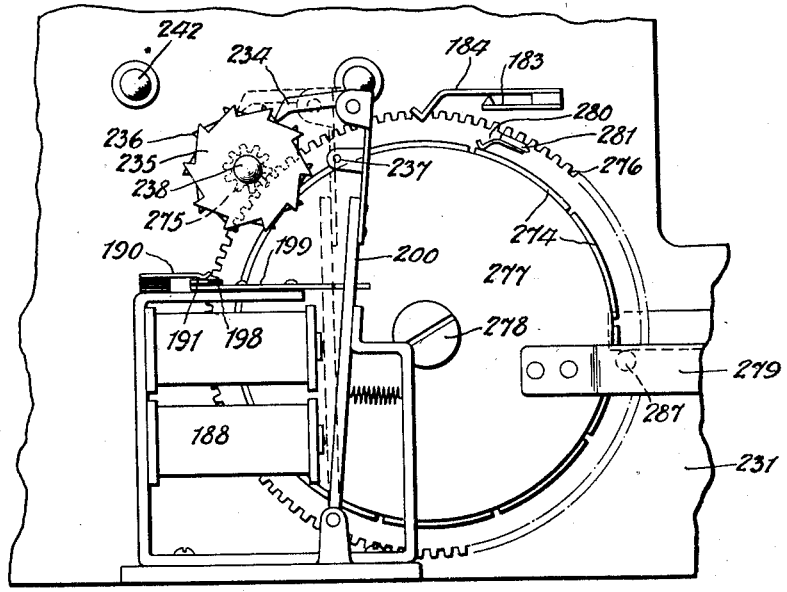

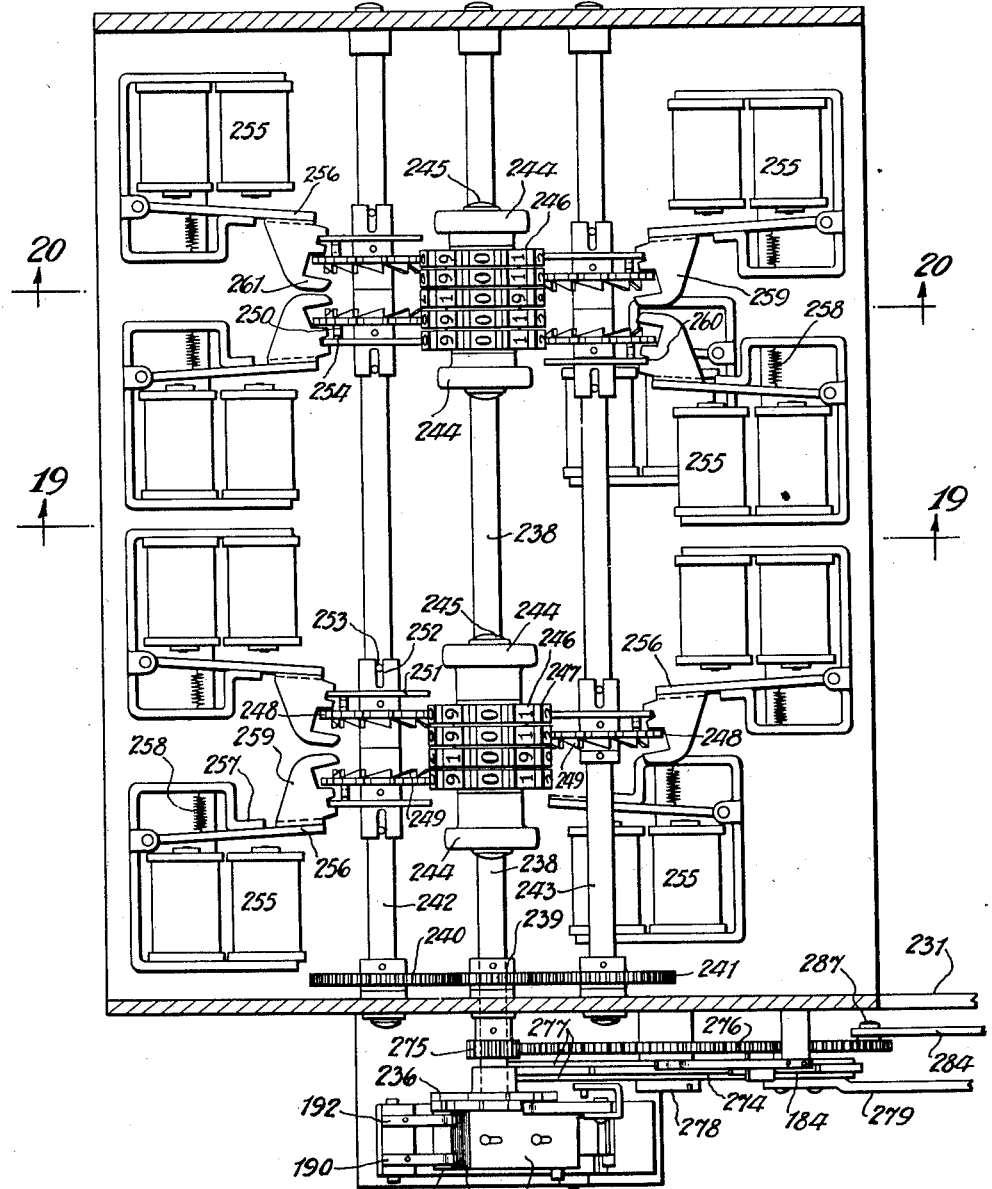

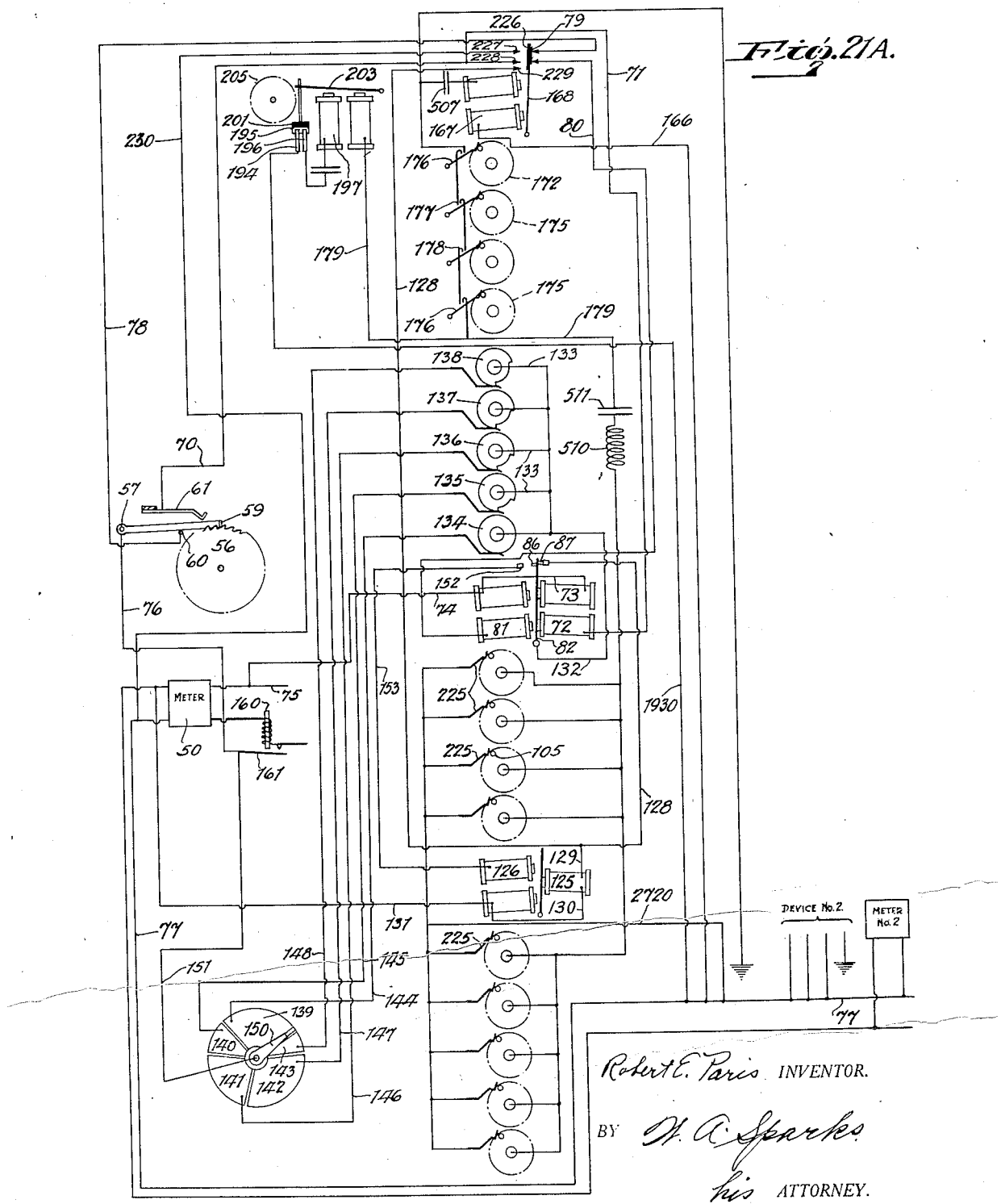

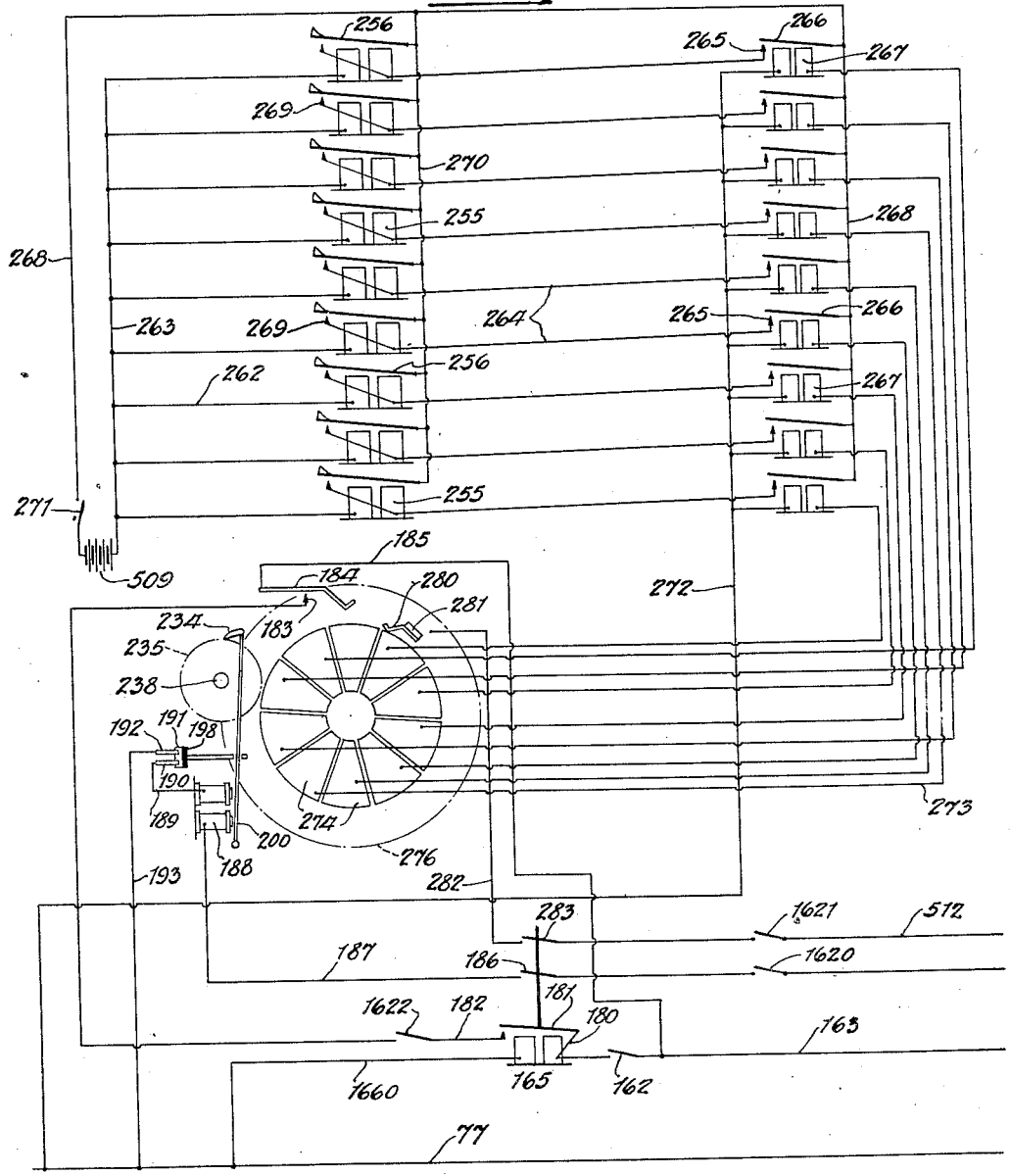

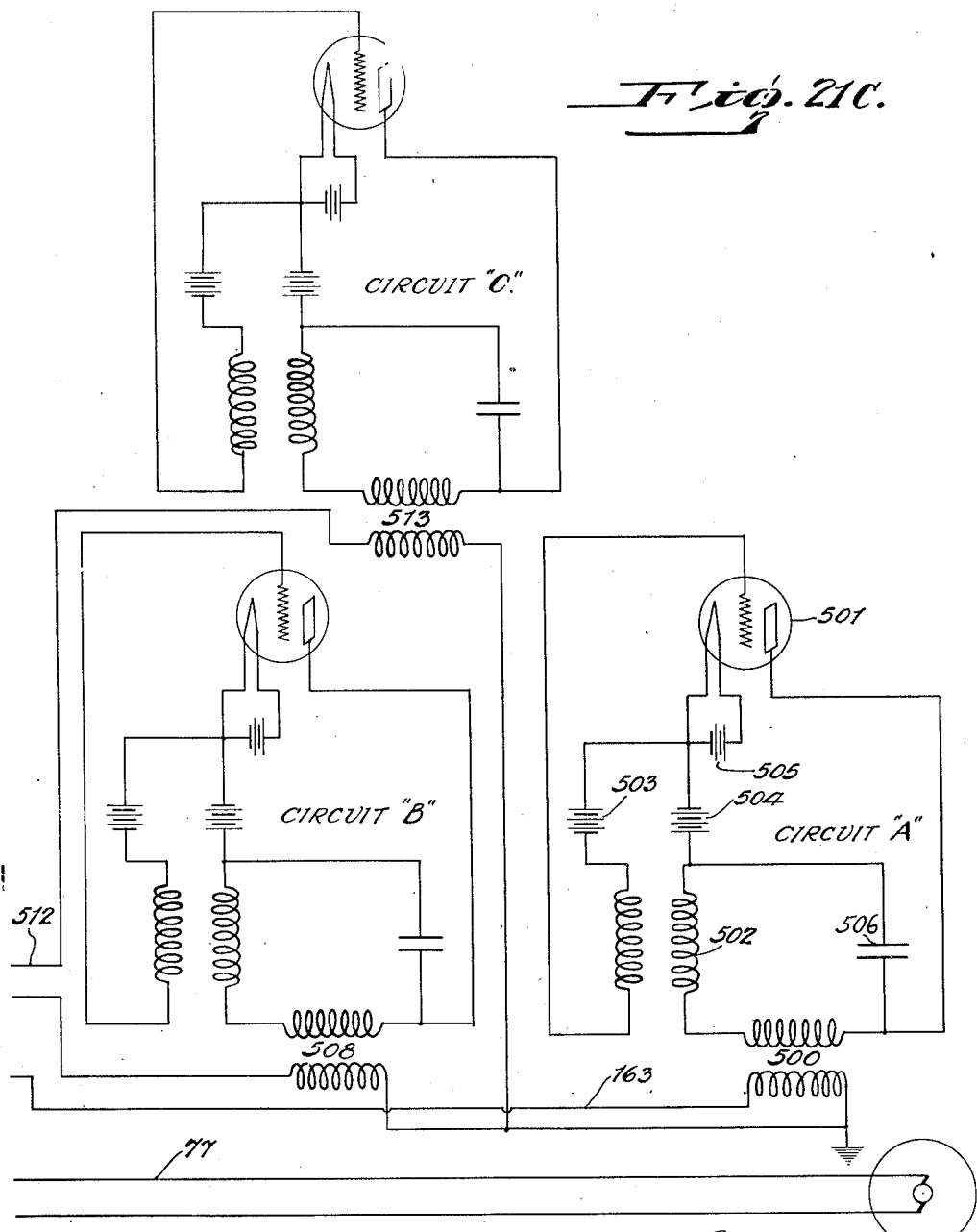

Patented Nov. 7, 1933

1,933,996

UNITED STATES PATENT OFFICE 1,933,996

ATTACHMENT FOR METERS

Robert E. Paris, New York, N. Y.

Application December 31, 1929
Serial No. 417,662

22 Claims. (Cl. 234—35)

This invention relates to attachments for meters and in particular to a method of effecting operation thereof. The invention is an improvement on the disclosure of my copending application Ser. No. 398,635, filed October 10, 1929.

One of the principal objects of the invention is to effect reading and recording from the meter devices by the use of tuned circuits.

Another object is to effect the reading and recording by currents sent over the power cable but independent of the power current.

Other objects will appear from the following description and the appended claims. I accomplish all of these objects by means illustrated in the accompanying drawings, in which:

Fig. 1 is a fragmentary vertical section of a standard Westinghouse meter provided with the necessary additional parts for operating my attachment.

Fig. 2 is an end elevation of my meter attached with part of the covering cut away.

Fig. 3 is a top plan view of the same taken substantially on line 3—3 of Fig. 2.

Fig. 4 is a similar view taken substantially on line 4—4 of Fig. 2.

Figs. 5, 6, 7, 8, 9, and 10 are vertical sectional views taken substantially on lines 5—5, 6—6, 7—7, 8—8, 9—9, and 10—10, respectively, of Fig. 3.

Fig. 11 is a reverse-side view of certain parts shown in Fig. 5.

Fig. 12 is a detail top plan view of the "reset-shaft".

Fig. 13 is a detail perspective view of one of the elements thereof.

Figure 6:
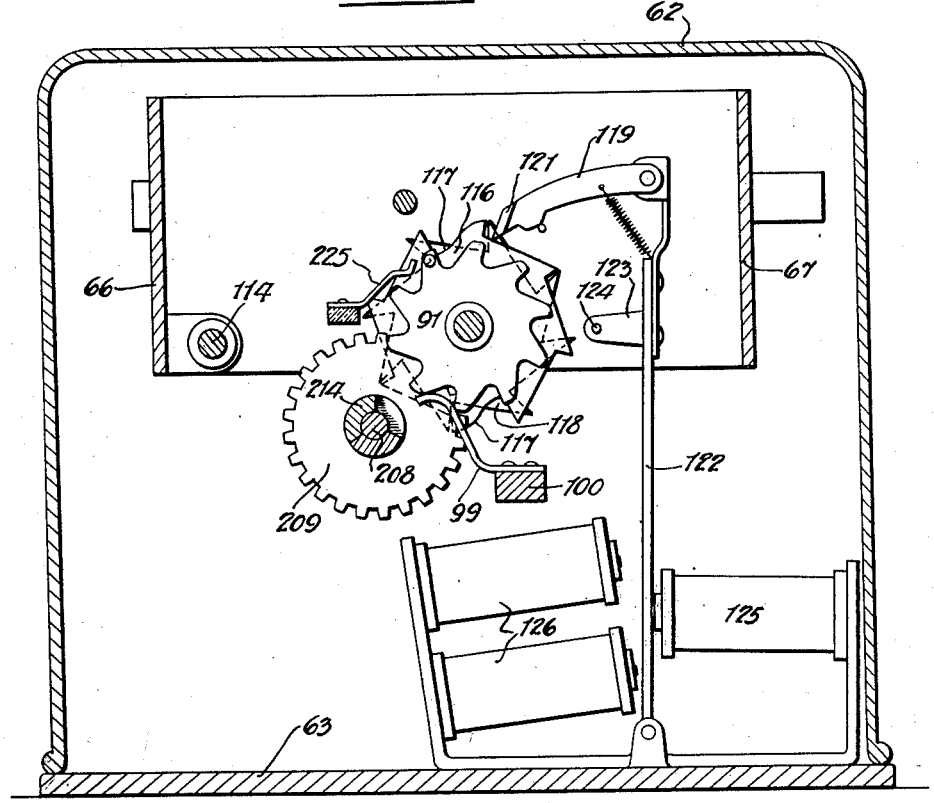
Figure 14:
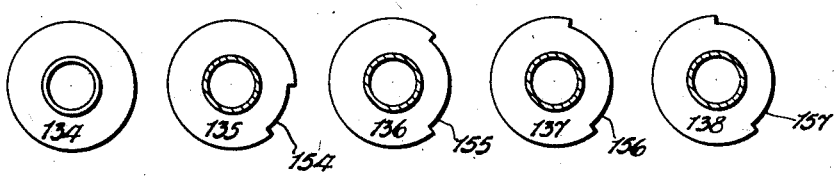

Fig. 14 is a view showing a comparison of the five translating disks.

Fig. 15 is a fragmentary detail elevation of one of the elements of the variable-rate translating devices.

Fig. 16 is an end elevation of the central receiving and recording machine.

Fig. 17 is an enlarged fragmentary elevation showing certain parts shown in Fig. 16.

Fig. 18 is a top plan view of the central receiving and recording mechanism taken substantially on line 18—18 of Fig. 16.

Figure 19:
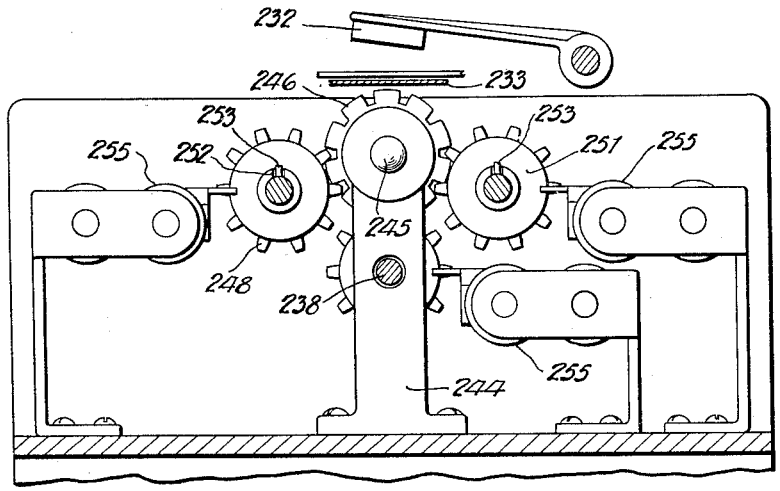
Figure 20:
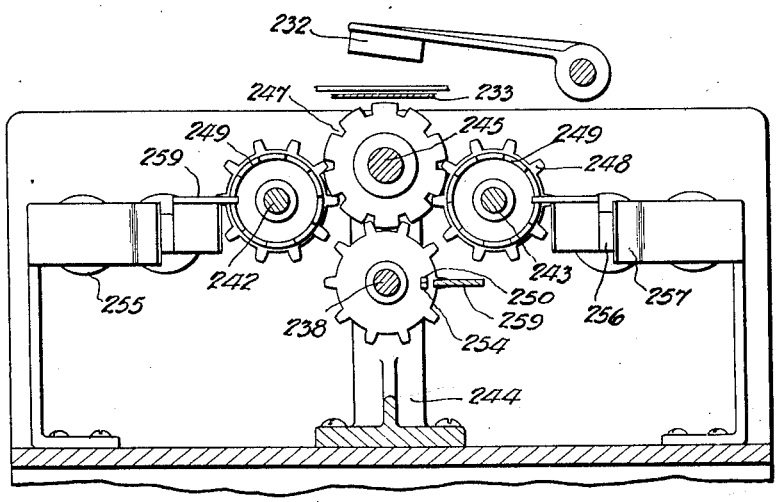

Figs. 19 and 20 are vertical sectional views taken substantially on lines 19—19 and 20—20 of Fig. 18, respectively.

Figs. 21A, 21B and 21C together form the wiring diagram for the system.

Like characters of reference refer to like parts in all views.

This device contemplates an improved circuit for controlling mechanism which may be attached to any meter of register such as an electric meter, gas meter, water meter, etc., and which will be operable by the meter or register to represent the number of k. w. hs., cubic feet, etc., and to represent the cost of the amount represented, and which upon being turned to zero or reset, will transmit the amount consumed and the cost to a recording instrument at a distance. It further contemplates the placing of a multiplicity of meter attachments,—say one thousand or more,—on a single line for controlling one recorder, and also contemplates means whereby the meters or registers are automatically selected in the desired order, and their readings separately obtained and recorded.

Referring to the drawings in detail, and particularly to Fig. 1, 50 represents the casing of an ordinary electric meter of a well known type including a main drive shaft 51 which carries the damping disk 52, and from which extends the train of gearing 53 to drive shaft 54 which is connected so as to drive the units indicator 55. The only thing added by the present invention to this old and well-known mechanism is a make-and-break contact, in this instance including the wheel 56 which is provided with twenty-eight ratchet teeth or cam lugs on its periphery. Pivotally mounted on an insulated bar 57 or otherwise suitably supported and insulatedly mounted is a rock-arm 58 carrying a finger 59 which rides on the periphery of 56 so as to be raised and lowered by the teeth or cams thereof. A stud 60, suitably insulated from the frame etc. of the machine, is adapted to limit downward movement of arm 58 and to complete one circuit; while a spring-contactor 61 is adapted to be contacted by an arm 58 upon the latter being lifted by any of the teeth of wheel 56 and thereby complete a different circuit.

Thus it will be seen that since for each k. w. h., wheel 56 is rotated once, there will be twenty-eight impulses thru 60 and the same number thru 61 for each k. w. h. These impulses are utilized to move register wheels to indicate k. w. hs., cost of registered k. w. hs. and to move certain disks for varying the rate. This mechanism will now be set forth.

Secured to the meter casing, or placed at a distance therefrom, as desired, is an attachment, the casing of which is indicated at 62. Within this casing and supported by a base plate 63 are transverse main frames 64 and 65, and intermediate frames 66 and 67 connecting 64 and 65, Fig. 3. Also between frames 66 and 67 are secondary frames 68 and 69. This framework forms a skeleton upon which the working parts of the attachment are mounted.

Turning now to Figs. 2, 3, 4, 5, 11 and 21A, it will be seen that the spring contactor 61 is connected by leads 70 and 71 to one side of an electromagnet 72. The other side of magnet 72 is connected by leads 73 and 74 to the meter line 75. The rod 57 is connected by lead 76 to the meter line 77, thereby completing the circuit thru magnet 72 whenever arm 58 is raised into engagement with contact 61.

Arm 58 is never in contact with both 60 and 61. However, when arm 58 takes its lower position, it contacts stud 60 and this closes a circuit thru a lead 78, across a bridge 79, over a lead 80 to one side of an electro-magnet 81, the other side of which is connected to lead 74, above mentioned.

It will then be seen, that upon the raising of arm 58, the magnet 72 will be energized, while upon the lowering of arm 58, the magnet 81 will be energized. The magnets 72 and 81 are provided with a common armature 82 which is pivoted at 83, Fig. 5, to the sub-frame 84 which supports the magnets 72 and 81. The armature 82 carries a pawl 85, and a pair of contactors 86 and 87.

The pawl 85 has at its free end a lateral finger 88 resting upon the edge of what I shall term the k. w. h. impulse wheel 89, and a lateral finger 90 extending in the opposite direction and adapted to carry or transfer from the impulse wheel 89 to the units register wheel 91 as will be presently set forth. The armature 82 being pivoted between the magnets 72 and 81 will stay in either position to which it may be drawn because it will have passed first to one side or the other of its center of gravity and also by friction of contactors 86 and 87. Whenever the magnet 81 is energized, and armature 82 is drawn by it, the pawl 85 effects a one-tooth movement of the k. w. h. impulse wheel 89. Such movement of the wheel is limited to a single tooth by a detent pin 92 which is carried by armature 82 and is adapted to engage the teeth of a detent wheel 93 secured to the impulse wheel 89. The pawl 85 is held down in active position by a light spring 94, and when armature 82 is attracted by magnet 72, a cam 95 rides up on a pin 96 fast to the frame member 68.

When electricity is being used, the operation of the meter causes rotation of wheel 56, and each tooth thereof effects successive energizing of magnets 72 and 81. This causes a single complete cycle of movement of pawl 85, thereby advancing the impulse wheel 89 one tooth. When the impulse wheel completes one revolution, the last tooth 97 is broad and deep and permits the finger 90 to engage the units wheel 91 of the k. w. h. counters. As the pawl 85 now makes its active excursion, the units wheel 91 is carried with it one step, this longer step being permitted by pin 92 entering a deep broad tooth 98 in detent wheel 93 (Fig. 11). The reason why this broad deep tooth is required, is because the impulse wheel 89 must have twenty-eight teeth while the units wheel 91 has only ten, each tooth of 91 representing one k. w. h.

There are four register wheels 91 of successive denominational orders for registering in k. w. h., the consumption of current. Each is provided with a detent spring 99 for holding it in adjusted position, such detents being supported by a strip 100.

The carrying or tens-transfer means between the several registers 91 will now be described, and is best shown in Figs. 7-9. Passing thru slots 101 and 102 in frames 66 and 67, respectively, are carry-bars 103 there being one for each necessary carry-over and arranged between the two registers from and to which carrying is to occur. One of these carry-bars is slightly different from the others, but for present purposes they may all be considered as alike. Each bar 103 fits rather closely in its slot 101 the edge of this forming a fulcrum for it to turn on when desired; but the slots 102 are extended considerably so that this end of each bar 103 may move from normal position shown in Fig. 7, counter-clockwise to a considerable degree.

Each bar 103 is provided on its lower edge with a cam surface 104 lying in the plane of a pin 105 on the register 91 of lower order. This cam portion 104 terminates in an abrupt shoulder 106. Each bar 103 also carries a depending arm 107 provided with a pin 108 extending into the plane of the higher-order wheel 91. Each bar 103 also has an aperture 109 embracing a rod 110, and formed with a cam edge 111. The operation is as follows: When one wheel 91 has registered eight units of movement, its pin 105 will be brought against shoulder 106 of the correlated bar 103; and as the wheel passes from eight-position to nine-position, the bar 103 is forced to the left in Fig. 7 bringing cam-face 111 up to rod 110 and pin 108 into the teeth of the next higher order wheel 91. As the operation progresses from nine position to normal, pin 105 pressing against shoulder 106 forces cam 111 to ride up rod 110 thereby swinging the member 103 counter-clockwise whereby pin 108 advances the next higher wheel 91 one tooth. Pin 105 thereupon escapes from shoulder 106 and gravity causes 103 to return to normal under influence of cam 111 and the striking of pin 108 on the next succeeding tooth. If the bar 103 does not return completely to the right, pin 105 will strike finger 107 upon its next revolution and move the bar 103 fully to the right.

In Fig. 8 is shown the carrying member 103 between the tens and hundreds registers 91 of the k. w. h. registers. This is slightly different from the other bars 103 in that it has a finger 112 for effecting a one-tooth advance of a ratchet wheel 113 fast on a shaft 114. The wheel 113 has thirty-four equally spaced teeth and a blank-space 115. This wheel 113 controls the means for calculating costs on a variable rate basis as will be fully described hereinafter.

We shall next consider the means for translating the k. w. h. registration into monetary values. In some cities the following rates are charged, and these will be considered as characteristic for the purpose of this specification:

Up to 1000 k. w. h_____ 7¢ per k. w. h.
1000 to 1400 k w. h_____ 6¢ per k. w. h.
1400 to 2200 k. w. h_____ 5¢ per k. w. h.
2200 to 3300 k. w. h_____ 4½¢ per k. w. h.
3300 and up Of course this is merely illustrative, and the machine can be adapted for any desired variable rate.

For registering the dollars and cents corresponding to the electric consumption, there are provided five register wheels 91 precisely like those of the k. w. h. register and with carrying bars 103 of the type shown in Fig. 7. There is also a monetary impulse wheel 116, Fig. 6 having eight teeth, two of which are deep teeth as indicated at 117, for carrying to the units of cents register wheel in the same manner as carrying was done from the impulse wheel 89 to the units k. w. h. wheel as above described, except that carrying is done twice for each rotation of impulse wheel 116 whereas it was done once for each rotation of wheel 89. The reason for this difference is that each rotation of impulse wheel 89 represents one k. w. h. whereas each rotation of impulse wheel 116 represents two cents.

Secured to the impulse wheel 116 is a detent wheel 118 having teeth to properly conform to the movements of impulse wheel 116. A pawl 119 similar to pawl 85 is formed with a lug 120 for driving impulse wheel 116 and with a lug 121 for carrying to the units of cents register 91. This pawl 119 is pivotally carried by an armature 122 which also carries a finger 123 carrying a detent pin 124 for coaction with detent wheel 118. Armature 122 is adapted to be retracted by an electro-magnet 125 and to be given its effective stroke by a magnet 126, Fig. 6.

We shall now consider the means for energizing the magnets 125 and 126. As seen in Fig. 5, when the armature 82 is retracted by magnet 72 the contactor 87 is brought into engagement with a contact 127 which, as shown in the wiring diagram, is connected by leads 128 and 129 to one side of magnet 125. The other side of magnet 125 is connected by leads 130 and 131 to the ground 75. The armature 82 is connected by leads 132 and 133 (actually the frame of the machine) to each of five rotatable disks 134, 135, 136, 137, and 138 which are connected to respective segments 139, 140, 141, 142, and 143 by leads 144, 145, 146, 147 and 148. A brush 149 carried by an arm 150 traverses the segments and connects one after another with a lead 151 passing to the positive line 77. The armature 82 when drawn over by magnet 86 causes contactor 81 to engage contact 152, Fig. 5, and, as shown in the wiring diagram, this contact is connected by a lead 153 to one side of the magnet 126. The other side of magnet 126 is connected to lead 131.

It will, therefore, be seen that as the impulse wheel 89 for k. w. h. is advanced the impulse wheel 116 for the monetary register is concomitantly operated. Now the impulse wheel 89 advances twenty-eight teeth or impulses for one k. w. h. and at the same time impulse wheel 116 will be advanced twenty-eight teeth or three and one-half revolutions. As the impulse wheel 116 advances the units of cents register one tooth or cent for each four teeth of wheel 116, the monetary register will be advanced seven teeth or cents for each k. w. h. This is for the initial rate. We shall now see how the varying rates are taken care of.

It will be remembered, that the carry bar 103 between the tens and hundreds k. w. h. registers was provided with a finger 112 which turned a ratchet wheel 113 one space whenever a carry to the hundreds register took place, see Fig. 8. This ratchet wheel 113 was secured to a rotary shaft 114, and to this shaft the arm 150 is also secured, so that as the ratchet 113 is advanced, arm 150 causes brush 149 to traverse the segments 139—143. When wheel 113 has been advanced ten teeth, one thousand k. w. h. have been consumed and the rate changes. The segment 139 is of such extent that this ten-tooth advance of ratchet 113 will have brought brush 149 onto segment 141; eight additional teeth will bring brush 149 onto segment 142; eleven more teeth will bring the brush onto segment 143; and the brush will stay on segment 143 because long tooth 115 of ratchet 113 is now in coactive relation to finger 112, and the latter can no longer operate ratchet wheel 113.

Each of the stationary segments 139—143 is connected electrically with a respective brush 1540 by the leads 144—148, each of these brushes riding on the periphery of a respective disk 134—138. As seen in Fig. 14, disk 134 has a complete concentric periphery, whereas the disks 135 to 138 have respective notches or cut away portions 154, 155, 156 and 157. The five disks 134—138 are secured to a common sleeve 158 secured to the hub 159, Figs. 3 and 4, of the impulse wheel 89 of the k. w. h. register. The sleeve 158 is connected as shown in the wiring diagram to a lead or leads 133 which is in reality the frame of the machine.

Now it will be seen that when the machine begins operating and until it has registered one thousand k. w. h. the current will pass thru segment 139 and consequently thru the disk 134. However, as soon as the register has reached one thousand k. w. h., brush 149 is moved onto segment 140 and the brush 1540 connected to this segment rides on disk 135. But disk 135 has a cut out part 154 sufficient to prevent four active impulses of armature 122 at each rotation of the impulse wheel 89 (representing one k. w. h.). Now it will be remembered that each active impulse of armature 122 registers a quarter of a cent. Consequently, each rotation of impulse wheel 89 is translated into one cent less or the rate of six cents per k. w. h., for consumption from one thousand to fourteen hundred k. w. h.

Similarly, when fourteen hundred k. w. h. has been registered, brush 149 is shifted to segment 141 which connects with disk 136. Now the cut out 155 of disk 136 is of sufficient extent to cause armature 122 to remain inactive during eight increments of movement of impulse wheel 89, so that two cents less than normal rate per k. w. h. is registered in conformity with the selected rate of five cents per k. w. h. from fourteen hundred to twenty-two hundred k. w. h. As the twenty-two hundred k. w. h. is registered, the brush 149 passes to segment 142. Segment 142 is connected to disk 137, the cut-out 156 of which corresponds to ten active impulses of armature 82 and impulse wheel 89. Thus while segment 142 is in control, the rate per k. w. h. is cut from the original seven cents to four and one-half cents. This rate covers from twenty-two hundred to thirty-three hundred k. w. h. As the latter registration is reached, brush 149 passes to segment 143, which is connected to disk 138, the cut-out portion 157 of which corresponds to eleven impulses of impulse wheel 89 and thereby reduces the rate to four and one-quarter cents per k. w. h.

It is to be noted that there is a relay 160 which as soon as electricity starts to pass thru the consumer's line, closes a switch 161 to connect leads 151 and 76 to the line 77.

And now having described the registering of the consumption in k. w. h. and in monetary value, we shall consider the transferring of these registered amounts from the several meters and recording the same at a distant central station. This operation includes the following: (1) Selecting the meters in the desired order; (2) reading the amounts from each meter and recording the same; (3) resetting the meter-attachments to condition for taking up further registering operations.

The system contemplates the connecting of a plurality of meter attachments such as above set forth, to a single recording machine such as an addressograph, and automatically calling the attachments into control of the addressograph in the desired order for billing purposes. The means for selecting the meter attachment to be called into control will now be described. I prefer to call this a selective grounding device, for current is sent to all of the attachments simultaneously, but only one is grounded at a time.

In the wiring diagram there is shown at 162 a switch which is manually or mechanically closed and immediately opened when it is desired to set mechanism going for doing the billing or recording. This switch is operated once for each meter attachment to be read and billed. Immediately upon closing switch 162, current is conducted from the secondary of an induction coil 500 the primary of which is connected in circuit with a thermionic valve 501, coil 502, batteries or sources of energy 503, 504 and 505 and condenser 506. This circuit which is indicated generally as "Circuit A" in Fig. 21C is "tuned" to cause a known frequency, and this high frequency current passes over lead 163 and switch 162 to one side of a switch-magnet or relay 165. The other side of relay 165 is connected to a lead 1660 which connects to the power line 77. From line 77 a respective lead 166 connects to one side of an electro-magnet 167 at each of the meter attachments, the other side of which magnet is permanently grounded, the current passing thru relay 167 and an associated condenser 507 which are tuned to the frequency of oscillating circuit A. Hence, it will be seen that immediately upon closing switch 162, the electro-magnet 167 is energized thereby attracting its armature 168 which is normally held against a stop 169 by a spring 170, Fig. 9. It will, of course, be understood that the leads 166 go to every meter attachment connected in the system, and when the circuit is closed by switch 162, the magnet 167 of each attachment is energized thereby advancing the selective ground devices of each one space. The magnets 165 and 167 are the only ones responsive to the frequency sent over lead 163. High frequency currents of different frequencies may be sent over power lines without practically interfering with the power current or with each other and without being interfered with by the power transmission.

The selective ground mechanism of each meter attachment includes a pawl 171 carried by the armature 168 and adapted to operate a ratchet wheel 172 one step at each energizing of the magnet 167. Secured to each ratchet wheel 172 is a detent ratchet wheel 173 which is adapted to coact with a detent pin 174 carried by armature 168, this detent couple preventing overrotation of ratchet 172.

Ratchet 172 is the units wheel of what, for want of a better term, I call the selective ground register. This is not a register in the sense of accumulating, but is rather a setting device. At the time that the system of meter attachments is installed, the attachment of each meter is assigned a different serial number and the selective ground devices are set according to these numbers. As the numbers are in rotation, it is obvious that operation of the devices will bring one after another to the neutral position corresponding to zero. As each selective ground device is brought to this position it grounds the reading devices, and the reading of that particular meter attachment and only that one will be had.

The several registers 172 and 175 (of the selective ground) have carrying devices 103 as in the other registers, and armatures 168 are operated once for each attachment read. The machine as illustrated has four selective ground register wheels and therefore, is one of a series of ten thousand attachments. Of course, the machines may be constructed for a less or greater series, as desired. Each of the cary-pins on the registers 175 coacts with a spring bridge piece 176 and when this bridge is raised by its carry pin it bridges a pair of contacts 177 and 178. The contact 177 of the lowest order wheel is connected to an earth ground and the contact 178 for each wheel is connected to the contact 177 of next higher order, the highest order contact 178 being connected to a lead 179. It will thus be seen that only when all of the bridges 176 of an attachment are up, is the lead 179 of that device grounded. In order to reach any desired meter attachment without reading any of the others, one may open three switches 1620 1621, and 1622 which will cut out the reading circuits and permit operation of the selective ground devices by repeated operation of switch 162.

When once the circuit is losed thru the relay 165, this relay is retained energized until the circuit is mechanically broken. This retention is attained by means of a "self" circuit running from one side of the relay thru a short lead 180 to the armature 181, over a lead 182 to a contact 183, thru a contactor 184 and lead 185 to line 163 and running from the other side of the relay 165 over lead 1660 to the ground as above described.

Having established the selective ground in one of the devices, it is necessary to return the k. w. h. and monetary registers thereof to zero, and to transfer the registrations to an accounting or billing machine. When the armature 181 is closed by its relay 165 it closes a switch 186, thereby closing a circuit from a coil 508 inductively coupled to an oscillating circuit B which circuit has a frequency different from that of current A, and through switch 186, a lead 187 to one side of a magnet 188, the other side of which is connected by a lead 189 to a contact 190 adapted to engage a movable bridge 191 which when in current passing position also contacts a contact 192. The circuit then continues over a lead 193 to power cable 77 and lead 1930 to a contact 194 bridge to a contact 196 by a movable bridge 195; contact 196 is connected to one side of an electro-magnet 197, the other side of which is connected to lead 179 above mentioned. This lead 193, of course, leads to power cable 77 which is common to all attachments but as far as oscillating circuit B is concerned is active only as to that one grounded by the selective ground. If both bridges 191 and 195 are in contact engaging position, current can travel over the circuit outlined energizing magnets 188 and 197.

Magnet 188 controls the positioning of the printing wheels at the central machine as will be later described; and magnet 197 controls the turning of the registers to zero. It is therefore, necessary that these two magnets and the parts operated thereby be kept "in step." It is for this purpose that the movable bridges 191 and 195 are provided. Bridge 191 and an adjacent strip 198 of insulating or non-conducting material are carried by a slide 199, Fig. 17, having a loose connection with the armature 200 of magnet 188. When magnet 188 is deenergized, the armature 200 will have moved slide 199 into position so that bridge 191 connects contacts 190 and 192. As soon as the magnet is energized, the armature moves toward the magnet but during the first part of such movement has no effect on slide 199 owing to the loose connection between these parts. As the armature nears the end of its stroke, it picks up the slide 199 and carries bridge 191 out of operative relation to contacts 190 and 192 and interposes the insulating material 198 therebetween.

The bridge 195 has similar associated parts shown in Fig. 10, where 201 represents the insulation strip, 202 the slide carrying 195 and 201, and 203 the armature of magnet 197. It will thus be seen that unless both magnets are deenergized the circuit will not be completed, so that both magnets must stay in step.

As seen in Fig. 10 armature 203 carries a pawl 204 which is adapted to engage and rotate a ratchet wheel 205 step-by-step. The usual detent ratchet wheel 206 is secured to 205 and coacts with a detent pin 207 carried by the armature 203. Hence at each vibration of armature 203, wheel 205 is advanced one tooth or step. Wheel 205 is secured to and rotates a shaft 208 supported in bearings in the frames.

As shown in Figs. 5 to 8, 12 and 13, the shaft 208 carries a plurality of gears 209, there being one for each register wheel of the k. w. h. and monetary registers. Each of these gears is mutilated, having two teeth removed at 210. This mutilated portion stands normally opposite a respective gear 211 secured to the respective register wheels. Gears 211 are also mutilated as indicated at 212, and when gears 211 are in zero position these mutilated portions stand opposite gears 209. Thus with gears 209 in normal position, the gears 211 are free to rotate; and when gears 211 are in zero position, gears 209 may turn without operating gears 211. But when any of the gears 211 have been moved to register and gears 209 are then turned, the gears 211 and their registers will be returned to zero or cleared.

The several gears 209 are provided with hubs which extend on each side and the hub of the lowest order k. w. h. gear 209 is pinned to shaft 208. All of the other gears 209 are free on shaft 208. The hubs of adjacent gears are formed as shown in Figs. 12 and 13 with laterally extending lugs 213 and 214, the lugs 213 of one extending into the plane of the lug 214 of the next higher order. The lug 213 of the highest order of k. w. h. extends into the plane of lug 214 of the lowest monetary order; and the lug 213 of the highest monetary order extends into the plane of a stationary stop lug 215. The lugs 213, 214 and 215 are all segmental, each having an extent of substantially 120 degrees. There is therefore a loose connection between all of the gears 209, the free space between any two adjacent gears being substantially 120 degrees or one third of a revolution. The relation of gears 209 and 211 is such that one third of a revolution of a gear 209 is sufficient to return the correlated gear 211 from any registering position to zero position.

A spring 216 is coiled about shaft 208, and has one end fast to a fixed portion of the machine, while the other end is secured to the shaft 208. Rotation of shaft 208 will effect tensioning of this spring 216. To prevent premature return rotation of shaft 208, gear 217 is secured to the end of shaft 208 and meshes with a large gear 218 freely rotatable on shaft 114.

As shown in Fig. 2, gear 218 carries a lug 219 which normally abuts against the tail 220 of a pawl, the detent portion 221 of which is adapted to engage the teeth of gear 218. A spring 222 holds this pawl in either engaging or non-engaging position. Counter-clockwise rotation of the pawl is limited by stop pin 223. As seen in Fig. 3, gear 218 also carries a return lug 224 for returning arm 150 to normal. As soon as the reading operations of shaft 208 begin, lug 219 moves away from element 220 permitting pawl 221 to ratchet over the teeth of 218, the pawl preventing retrograde movement of 218 and 208. As the movement progresses, lug 224 picks up arm 150 and returns the same to normal position, at which time lug 219 will press against element 220 and raise element 221 against stop 223 where it will be held by spring 222 passing from one side to the other of the pivot of pawl 220—221. The spring 216 is then able to take effect and return the shaft 208 and gear 218 to normal whereupon lug 219 strikes element 220 moving the pawl back into engaging relation to gear 218.

Upon beginning to rotate shaft 208, the gear 209 for the units k. w. h. first takes effect returning the units of k. w. h. register 91 to zero unless it is already at zero. During the last increment of movement of this register its carry pin 105 engages a spring contact 225 closing a circuit to stop rotation of the corresponding printing wheel or other registering or recording device at the central station or reading device.

After the units k. w. h. gear 209 has advanced far enough to return its correlated register from any registering position to zero, the tens k. w. h. gear 209 is picked up and returns its correlated register wheel 91 to zero unless the same was already at zero, and so on thru all the k. w. h. gears 209 and then thru all the monetary gears 209.

It may be well at this point to note that when the magnet 167 was energized at the beginning of the reading operation, the armature in being drawn over moved bridge 79 out of its connecting relation to leads 78 and 80, opening this circuit, and at the same time moved a bridge 226, Fig. 21A, across three contacts indicated at 227, 228 and 229. Contact 227 is connected by a lead 230 to the positive meter line 77 and passes current across the bridge 226 to the two contacts 228 and 229. Contact 228 is connected to lead 71 and when in contact with bridge 226 effects energizing of magnet 72 thereby drawing armature 82, Fig. 5 over until its pawl 85 is out of possible interference with units gear 91 of the k. w. h. register. In like manner and for a similar purpose bridging of contacts 227 and 229, effects operation of magnet 125 of the monetary register, contact 229 being connected to lead 128.

We shall now turn to the central registering and/or recording device. While for simplicity, I have shown this central device, Figs. 16-20 and 21B as an attachment for an addressograph, it will be understood that the same might be an adding machine, a listing machine, a tabulating machine, or any such instrument which might have its accumulating and/or printing mechanism controllable by electric impulses.

The framework of the addressograph is shown at 231 and may be of any suitable shape to support the known addressograph mechanism and the mechanism now to be described. Only a few parts of the known mechanism are shown, such mechanism being old and well known in the art.

The platen is shown at 232, and the ribbon at 233, and coact in a well-known manner with addressograph plates to effect printing of the name and address.

It will be recalled that when switch 162 was closed, magnets 188 and 197 were started working and caused to vibrate their armatures 200 and 203 in step with each other. We have already seen that vibration of armature 203 causes the returning of the registers to zero. At the same time, armature 200 effects turning of printing wheels, as will now be set forth.

The armatures 200 carries a pawl 234 which operates on the teeth of an impulse ratchet wheel 235 having a detent ratchet wheel 236 secured to it and cooperative with a detent pin 237 carried by armature 200. The wheels 235 and 236 are fast on a shaft 238 which also carries a gear 239 meshing with two gears 240 and 241 mounted on respective shafts 242 and 243. It is therefore apparent that rotation of ratchet 235 will cause rotation of shaft 238 in a counter-clockwise direction and shafts 242 and 243 in a clockwise direction. Hence the type on the type-wheels driven by shaft 238 are placed in reverse sequence to those on type wheels driven by shafts 242 and 243.

Brackets 244 are secured to the base of the machine and extend upwardly and carry at their upper ends shafts 245 upon which type-wheels or printing wheels 246 are loosely mounted. There is a separate shaft 245 and separate wheels 246 for the printing of the k. w. h. and monetary registrations, but as all are constructed and operated alike, they are given the same reference characters. Each type-wheel 246 has digit type cut or engraved in or embossed on it, and between, the type are depressions 247 which receive the teeth of actuating wheels 248.

The several actuating wheels 248 are mounted on shafts 238, 242 and 243, upon which they are freely mounted, altho confined against axial movement by collars pinned to the shafts. Each gear 248 also carries lateral detent teeth 249, and a driving lug 250.

Mounted on shafts 238, 242 and 243 are clutch disks 251, one for each gear wheel 248. Each disk 251 has its hub extended and formed with a slot 252 embracing a pin 253 secured in the correlated shaft. On each disk 251 is a lug 254 adapted to engage and drive the lug 250 on the correlated wheel 248. The clutch disks may, however, be moved for enough longitudinally on their shafts to bring their lugs 254 out of coacting relation with the respective lugs 250.

There is provided a magnet 255 for each clutch disk 251, each magnet 255 having an armature 256 normally held against a stop 257 by a spring 258. Secured to each armature 256 is a member 259 having a slot 260 embracing the edge of the correlated clutch disk 251 and a detent finger 261 normally out of engagement from teeth 249 of the correlated wheel 248. When any magnet 255 is energized and its armature 256 and member 259 is moved to ineffective position, i. e. its lug 254 is moved out of coactive relation to the associated lug 250. At the same time detent 261 is brought into teeth 249 preventing further rotation of gear 248.

We have seen how the type-wheels are advanced by the rotation of impulse wheel 235, and we shall now consider how the magnets 255 are operated to cause the type wheels to stop when they reach positions corresponding to the registers.

Referring to Fig. 21B, it will be seen that all of the magnets 255 are grounded to a local source of power indicated at 509 by leads 262 and 263. The other side of each magnet 255 is connected by a respective lead 264 to a contact 265 adapted to be engaged by the armature 266 of a respective relay 267, the armatures 266 of all of the relays being connected to a lead 268 passing to the positive side of the source of power 509. Each magnet 255 has its positive side connected to a contact 269 adapted to be engaged by the armature 256 of the magnet when the latter is energized. All of the armatures 256 are connected to a lead 270 connecting to lead 269 and including a switch 271 automatically closed at each operation of the addressograph by any suitable mechanism (not shown). Hence when a magnet 255 is energized it stays energized until switch 271 is again permitted to open, breaking all of these "self" circuits of the several magnets 255.

The several relays 267 of which there is one for each magnet 255, are all grounded by a lead 272 which runs to the power cable 77. At each of the several attachments there is a cooperative lead 2720 which is connected to the spring contacts 225 above mentioned. As each pin 105 contacts its brush 225, connection is made thru lead 179, a coil 510 and condensor 511 which are tuned to the frequency of oscillating circuit C, thru the selective ground elements 177 and 178 to the ground. The positive side of each relay 267 is connected by a respective lead 273 to a respective segment 274. There are nine relays 267 but ten segments 274, the tenth or final segment having no electrical connection.

Secured to shaft 238 is a pinion 275 which meshes with a large gear 276. The segments 274 are carried between a pair of disks 277 of insulating material, such disks and gear 276 being carried by a stud 278. The disks and segments are prevented from rotating by member 279, but gear 276 may rotate, the relationship of parts being such that each rotation of shaft 235 and gear 275 effects one-tenth of a revolution of gear 276. Gear 276 carries a brush 280 which rides on the segments 274, and a contact breaker 281. The gear 276 is connected by a lead 282 with lead 512 having switch 1621, to a coil 513 inductively coupled to oscillating circuit C, the frequency of which circuit is different from those of circuits A and B. Lead 282 includes a switch 283 which is automatically closed and opened by the armature 181.

As soon as the reading operation begins and the selective ground is determined, the armatures 200 and 203 begin to vibrate; but by that time current has passed from lead 512 over switch 283, lead 282, the gear 276, contact brush 280, first segment 274, respective lead 273 to first relay 267 over 272 to the contacts 225. However, here the circuit is broken, so that the relay is not energized until the first k. w. h. register is turned to its contact position which is between "1" and "0", at which time its pin 105 contacts the spring contact 225 thereby grounding the latter. As the circuit is completed the first relay is energized and its armature closes the circuit thru the first magnet 255, closing the "self" circuit for the latter and moving its correlated member 259 to throw out its clutch and stop the first k. w. h. printing wheel 246. Brush 280 has now passsed to the second segment 274 and the operation proceeds for the second relay 267, magnet 255 and k. w. h. register. When all nine registers have been read and their printing wheels set, the brush 15( 280 passes onto the tenth segment 274 which has no connection, and the lug 281 raises contactor 184 breaking the "self" of magnet 165. The platen takes an impression.

When a register wheel 91 stands at zero it is not operated during the reading cycle for that wheel owing to the mutilated gears, and consequently the correlated magnet 255 is never operated. However, the printing wheel associated with that register stood at zero at the beginning of the reading operation and made a complete cycle for each segment 274 traversed so that the printing wheel is at the zero position at the time that the printing impression is taken.

During the operation, an arm 284, Fig. 16, is raised by a cam 285 acting on a pin 286, and a pin 287 on gear 276 has moved under the free end of the arm 284. This arm is now released, and is pulled down by a spring 288, carrying pin 287 and gear 276 back to normal. Contactor 184 returns to normal, switch 271 opens, and the devices are ready to read the next attachment. As gear 276 moves back to normal, it gives pinion 275 and shaft 238 one complete rotation, and as the clutches have moved back to effective position, their rotation picks up all of the type wheels and returns them to zero.

The circuit as shown, therefore, consists of a power cable as one conductor and the earth as the second conductor. At the central recording station, three oscillating circuits having different periods of oscillations under suitable control of the printing or operating machine, are inductively coupled between the power cable and the earth. At each meter attachment are three circuits tuned to correspond to the oscillation periods of the three circuits at the printing or operating machine. These three circuits also are connected between the same power cable and the earth.

Oscillating circuit A, which, for example, might have an oscillation period of one thousand per second, would control only switch magnet 165 and selecting ground magnets 167. Oscillating circuit B, which might have an oscillation period of two thousand per second, would control only impulse magnets 188 and 197. Oscillating circuit C, which might have an oscillation period of three thousand per second, would control only the number printing relays 267 thru the selective ground circuit at the desired meter attachment.

This circuit altho shown in connection with a simple two-wired D. C. circuit for the sake of simplicity, is adaptable to both A. C. and D. C. circuits.

While I have described what I consider to be the most desirable embodiment of my invention for the purpose set forth, it is obvious that changes in form could be made without departing from the spirit of my invention, and I, therefore, do not limit myself to the exact details herein shown and described, or to anything less than the whole of my invention as hereinafter particularly pointed out in the appended claims.

I claim:

1. In a recording system, a plurality of groups of registering devices, a central recording device, a circuit for interconnecting all of said groups of devices and means including electrically tuned circuits associated with said devices for controlling said central recording device in accordance with settings on any group of said registering devices.

2. In a recording system, a plurality of groups of registering devices, a central recording device, tuned circuits interconnecting all of said devices including a circuit for effecting automatic selecting of one group of said devices after another and means associated with said devices for controlling said central recording device in accordance with settings on any of said registering devices.

3. In a recording system, a plurality of groups of registering devices, a central recording device, tuned circuits interconnecting all of said devices, said tuned circuits including magnets associated with said devices, means for impressing electric oscillations on said circuits for operating said magnets, and means associated with said magnets for controlling said central recording device in accordance with settings on any group of said registering devices.

4. In a recording system, a plurality of groups of registering devices, a central recording device, a power line, the readings of said registering devices indicating power consumption in said power line, secondary tuned circuits including magnets associated with each of said devices, said power line being in series with each tuned circuit, means for impressing electrical impulses of predetermined frequency on said tuned circuits for controlling said magnets, and means responsive to operation of said magnets for controlling said central device in accordance with settings on the registering devices of one after another of said groups and for automatically selecting the groups.

5. In a recording system, a power circuit, a plurality of groups of registering devices operable in response to power consumed in said circuit, a central recording device, magnets associated with each of said devices and connected to said power circuit to provide magnet circuits each of said magnet circuits being tuned to respond to a predetermined frequency, means for impressing electrical oscillations on said tuned circuits corresponding to said predetermined frequency, and means associated with each of said devices and said tuned circuits and operable by said magnets for controlling said central device in accordance with settings on one after another of said registering devices and for automatically selecting the groups.

6. In a recording system, a plurality of registering devices, a central recording device, tuned circuits interconnecting said devices, one of said circuits including a selector magnet and means associated therewith for selecting a register to be read, another of said circuits including magnets and means associated therewith for impressing oscillations on said circuits of such frequency as to operate said magnets.

7. In a recording system, a plurality of registering devices, a central recording device, tuned circuits interconnecting said devices, one of said circuits including a selector magnet and means associated therewith for selecting a register to be read, another of said circuits including magnets and means associated therewith for clearing said registers and for transferring selected readings to said central device, and means for impressing oscillations on said circuits of such frequency as to operate said magnets.

8. In a recording system, a plurality of registering devices, a central recording device, tuned circuits interconnecting said devices, one of said circuits including a selector magnet and means associated therewith for selecting a register to be read, another of said circuits including a clearing magnet for each register and a transfer magnet for said central recorder, and means associated therewith for clearing said registers and for transferring selected readings to said central device, and means for impressing oscillations on said circuits of such frequency as to operate said magnets.

9. In a recording system, a plurality of registering devices, a central recording device, tuned circuits interconnecting all of said devices, said circuits including magnets associated with each of said devices, means for impressing a plurality of electrical oscillations of predetermined frequency on said circuits, means responsive to oscillations of one frequency for selecting a desired register to be read, and means responsive to oscillations of another frequency for transferring the reading of the selected register to said central recording device.

10. In a recording system, a plurality of registering devices, a central recording device, tuned circuits interconnecting all of said devices, said circuits including magnets associated with each of said devices, means for impressing a plurality of electrical oscillations of predetermined frequency on said circuits, means responsive to oscillations of one frequency for selecting a desired register to be read, each of said devices including register wheels, means responsive to oscillations of another frequency for returning the wheels of the selected register to normal position, and means operable in timed relation to the returning means for giving a reading on the central device as said wheels are returned to normal position.

11. In a recording system, a plurality of registering devices, a central recording device, tuned circuits interconnecting all of said devices and including magnets associated with said devices, means for impressing electrical oscillations of different frequency on said circuits, means responsive to one of said oscillations and to magnets operated thereby for calling one of said registering devices into control of said recording device, and means responsive to another oscillation frequency and to magnets operated thereby for transferring the registration of such active register to said recording device.

12. In a recording system, a plurality of registering devices, a central recording device, tuned circuits interconnecting all of said devices and including magnets associated with said devices, means for impressing electrical oscillations of different frequency on said circuits, means responsive to one of said oscillations and to magnets operated thereby for calling one after another of said registering devices into control of said recording device, and means responsive to another oscillation frequency and to magnets operated thereby for transferring the registration of each register to said recording device.

13. In a recording system in combination, a plurality of registers, a central recorder, tuned circuits interconnecting all of said registers to said recorder, a thermionic oscillation generator for impressing a predetermined oscillation frequency on said circuits, and means associated with said devices and responsive to said oscillation frequency for tranferring registrations from said registers to said central recorder.

14. In an electrical recording system, a plurality of distributed registers, a central receiving device, tuned circuits common to all of said registers and central receiving device, thermionic oscillation generators for impressing predetermined oscillation frequencies on said circuits, and means associated with said registers and receiver and responsive to said oscillation frequencies for selecting a desired register to be read and for controlling said receiver in accordance with the settings of said selected register.

15. In an electrical recording system, a power circuit, a plurality of meters on said circuit, a registering device associated with each of said meters, a central receiving device, magnets associated with each of said devices and connected to said power circuit, means for impressing a plurality of predetermined oscillation frequencies or said power circuit for selectively operating said magnets, and means responsive to operation of said magnets for controlling said receiving device in accordance with the settings of said registering devices.

16. In an electrical recording system a plurality of groups of registering devices, a central receiving device, a circuit common to said devices and extending therebetween, tuned circuits associated with each of said devices and connected to said common circuit, said tuned circuits being responsive to a predetermined impressed frequency, means for impressing a plurality of frequencies on said common circuit for operating said magnets, and means responsive to operation of said magnets for controlling said receiving device in accordance with the settings of one group after another of said registering devices and for automatically selecting the groups.

17. In a recording system, a plurality of groups of distributed registering devices, a central recording device, a main conductor extending to points adjacent each of said devices, a plurality of oscillation generators of different frequency, secondary conductors connecting each of said generators to said main conductor, means for completing the circuit for each of said secondary conductors, a magnet associated with each of said devices, other conductors extending from said main conductor through said magnets to means for completing the circuits, said magnets and associated circuits being responsive selectively to oscillations from said generators, and means associated with said devices and said magnets for transferring readings from one after another of said groups of registering devices to said central device and for automatically selecting the groups.

18. In a recording system, a plurality of registering devices, a central recording device, a main conductor extending to points adjacent each of said devices, a plurality of oscillation generators of different frequencies tuned circuits extending from said generators to each of said devices, each tuned circuit including said main conductor in series therewith, a magnet associated with each of said devices and included in one of said tuned circuits, said magnets being responsive to oscillations impressed upon the related circuits by the corresponding oscillation generator, means responsive to operation of the magnets at the registering devices for selecting a device to be read, and means responsive to other of said magnets for transferring said reading to said central recorder.

19. In a recording system, a plurality of registers, a central recorder comprising wheels, each register comprising a selector magnet, a tuned selector circuit for energizing said selector magnet, a clearing magnet for each register and a setting magnet for said recorder, a tuned circuit for energizing said last named magnets, means comprising clutches and relays for limiting the rotation of said recorder wheels, a tuned circuit for energizing said relays, an electro-magnet comprising an armature in series with said selector circuit, switches in said clearing magnet and relay circuits respectively, and means for closing said switches in response to operation of said armature.

20. In a recording system, a plurality of registers each comprising wheels, a central recorder comprising wheels, a tuned circuit including an electromagnet and means controlled thereby for automatically selecting a desired register, a second tuned circuit including a clearing magnet and a setting magnet and means controlled thereby for simultaneously returning said register wheels to zero and transferring the readings thereof to said central recorder, and means for impressing an oscillation on each tuned circuit of a frequency necessary to operate each magnet included therein.

21. In a recording system, a plurality of registers each comprising wheels, a central recorder comprising wheels, a tuned circuit including an electromagnet and means controlled thereby for automatically selecting a desired register, a second tuned circuit including a clearing magnet and a setting magnet and means controlled thereby for simultaneously returning said register wheels to zero and transferring the readings thereof to said central recorder, a third tuned circuit including clutch magnets associated with said central recorder wheels, and means for impressing an oscillation on each tuned circuit of a frequency necessary to operate each magnet included therein.

22. In a recording system a plurality of distributed registers each comprising register wheels, a central recorder comprising recorder wheels each register comprising a selector magnet and a clearing magnet, a setting magnet associated with said central recorder for setting the wheels thereof, clutches associated with the wheels of said central recorder, means comprising relays for controlling said clutches, a tuned circuit including said selector magnet and means responsive to energization of said selector magnet for selecting a desired register to be read, a tuned circuit including said clearing magnets and said setting magnet and means responsive thereto, respectively, for returning the register wheels to normal position and for rotating the recorder wheels in accordance with the register settings, a tuned circuit including said clutch relays, and means for impressing oscillations on each of said tuned circuits of such frequency as to cause operation of the related magnets or relays.

ROBERT E. PARIS.